(12) United States Patent
Kwon et al.

(10) Patent No.: US 8,807,626 B2
(45) Date of Patent: Aug. 19, 2014

(54) LINEAR TYPE CENTER RAIL LINK STRUCTURE OF SLIDING DOOR FOR VEHICLE

(71) Applicant: Hyundai Motor Company, Seoul (KR)

(72) Inventors: Young Jin Kwon, Seoul (KR); Hyung In Yun, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/711,565

(22) Filed: Dec. 11, 2012

(65) Prior Publication Data

US 2014/0110966 A1  Apr. 24, 2014

(30) Foreign Application Priority Data

Oct. 19, 2012  (KR) .................. 10-2012-0116458

(51) Int. Cl.
*B60J 5/06* (2006.01)
(52) U.S. Cl.
USPC ........................................ 296/155; 296/146.4
(58) Field of Classification Search
USPC .................. 296/146.4, 155; 49/502
See application file for complete search history.

(56) References Cited

U.S. PATENT DOCUMENTS

| 4,464,863 | A * | 8/1984 | Chikaraishi et al. ............ 49/213 |
| 4,502,246 | A * | 3/1985 | Minami .......................... 49/322 |
| 8,353,555 | B2 * | 1/2013 | Boettcher ...................... 296/155 |
| 2005/0082871 | A1 * | 4/2005 | Anders .......................... 296/155 |
| 2006/0175867 | A1 * | 8/2006 | Heuel et al. .................... 296/155 |
| 2007/0085374 | A1 * | 4/2007 | Mather et al. .................. 296/155 |
| 2009/0230724 | A1 * | 9/2009 | Fischer et al. ................. 296/155 |

FOREIGN PATENT DOCUMENTS

| KR | 10-2006-0066412 A | 6/2006 |
| KR | 10-2007-0044591 A | 4/2007 |
| KR | 2010-0029655 A | 3/2010 |

* cited by examiner

*Primary Examiner* — Jason S Morrow
(74) *Attorney, Agent, or Firm* — Morgan, Lewis & Bockius LLP

(57) ABSTRACT

A linear type center rail link structure of a sliding door for a vehicle includes: a linear type center rail corresponding to the sliding door and mounted at a side of a car body; a base provided to be movable along the center rail; a link arm having one end rotatably inserted into the base; a slider rotatably connected to the other end of the link arm and having an outer side coupled to the sliding door slid from the car body; and a latch part provided in the base to limit rotation of the link arm. Therefore, an indoor invasion amount of the center rail is minimized, thereby making it possible to secure an indoor space, the linear type center rail is used, thereby making it possible to improve a design of a vehicle, and the link structure is provided, thereby making it possible to improve operability.

4 Claims, 7 Drawing Sheets

US 8,807,626 B2

LINEAR TYPE CENTER RAIL LINK STRUCTURE OF SLIDING DOOR FOR VEHICLE

CROSS-REFERENCE TO RELATED APPLICATION

The present application claims priority of Korean Patent Application Number 10-2012-0116458 filed Oct. 19, 2012, the entire contents of which application is incorporated herein for all purposes by this reference.

BACKGROUND OF INVENTION

1. Field of Invention

The present invention relates to a linear type center rail link structure of a sliding door for a vehicle, and more particularly, to a linear type center mil link structure of a sliding door for a vehicle for decreasing an indoor invasion amount of a center rail curve part of the sliding door and improving operability of opening and closing of the sliding door.

2. Description of Related Art

Generally, a side of a car body of a small is installed with a sliding door that may be opened and closed in a sliding scheme so that passengers may get or get off the small van.

In addition, a central point and a lower point of the sliding door are installed with a center roller and a lower roller, respectively. The center roller and the lower roller are inserted into a rail installed at the car body, respectively, to be rolled along the rail, such that they are slid with respect to the car body.

Meanwhile, as the sliding doors, a power sliding door automatically opened or closed by operating a switch has been recently used.

In addition, the power sliding door has a structure in which it is automatically opened or closed using a driving apparatus such as a motor or a cylinder and several power transfer units such as a cable, a belt, a pulley, and a gear and includes an electrical control unit (ECU) controlling an operation of the driving apparatus together with a door switch.

In addition, as shown in FIG. 1, a driving apparatus 6 of a power sliding door has a structure of moving a cable 5 connected to a front pulley 3 and a rear pulley 4 each disposed at front and rear end portions of a center rail 2 mounted at a car body to move a center roller 1 mounted at and fixed to the cable 5.

Further, the center roller 1 includes a support bracket 10 mounted at and fixed to a door panel of the sliding door; a roller bracket 20 mounted at the support bracket 10 and including a roller 21 coupled to the center rail 1 of the car body to thereby be rolled; a barrel 30 fixed to the roller bracket 20 and having the cable 5 penetrating therethrough and fixed thereto, the cable 5 being moved by the driving apparatus 6; and a fixing bracket 40 fixing the barrel 30 to the roller bracket 20.

That is, the cable 5 connected to the driving apparatus 6 through the front pulley 3 and the rear pulley 4 is moved by an operation of the driving apparatus 6, and the center roller 1 is moved along the center rail 2 together with the movement of the cable 5 to open or close the sliding door.

Meanwhile, the fixing bracket 40 is coupled and fixed to the roller bracket 20 by a bearing 22 formed at a central portion and includes hook parts 40a formed at both ends thereof and bent in a hook shape, wherein the hook parts 40a fix the barrel 30 while enclosing the barrel 30 in two directions in which the cable 5 is moved, as shown in FIG. 2.

However, according to the related art, since the center rail of the sliding door has a curve shape, an indoor invasion amount is excessively generated, such that an indoor space is decreased. In addition, operation force of a door handle is dispersed, such that operating force is deteriorated at the time of opening or closing the sliding door.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art while advantages achieved by the prior art are maintained intact.

Various aspects of the present invention provide for a linear type center rail link structure of a sliding door for a vehicle for decreasing an indoor invasion amount of a center rail curve part of the sliding door and improving operability of opening and closing of the sliding door.

In one aspect of the present invention, there is provided a linear type center rail link structure of a sliding door for a vehicle, including: a linear type center rail mounted at a side of a car body; a base provided to be movable along the center rail; a link arm having one end rotatably inserted into the base; a slider rotatably connected to the other end of the link arm and having an outer side coupled to the sliding door slid from the car body; and a latch part provided in the base to limit rotation of the link arm.

An outer side of the base may be provided with a bearing.

The base and the center rail may be provided with a catching hole, and the latch part may include: a lever rotatably provided in the base and having a distal end selectively entering or leaving the catching hole; and a. pole having one end selectively engaged with or disengaged from the lever and the other end locked to or unlocked from the link arm, by the rotation of the link arm.

The lever may include a spring, such that it is restored after being rotated.

A first pivot axis may be formed between the link arm and the slider to enable the slider to be rotated, and a second pivot axis may be formed between the base and the link arm to enable the link arm to be rotated.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
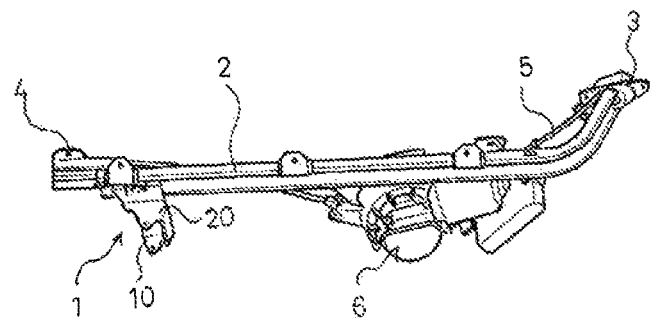
FIGS. 1 and 2 are views showing a structure of a sliding door according to the related art.
Figure 2:
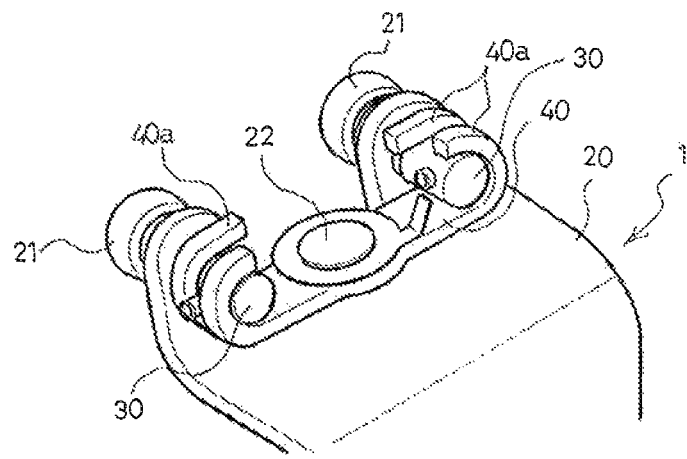
Figure 3:
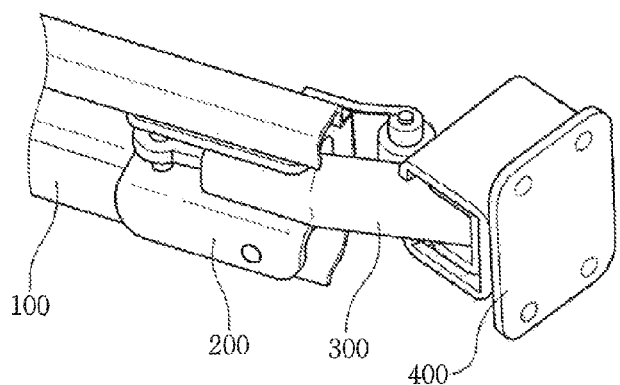
FIG. 3 is a view showing an exemplary linear type center rail link structure of a sliding door for a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

A linear type center rail link structure of a sliding door for a vehicle according to various embodiments of the present invention is configured to include a center rail 100 mounted at a car body, a base 200 provided in the center rail 100, a link arras 300 inserted into the base 200, a slider 400 connecting the link arm 300 and the sliding door of the car body to each other, and a latch part 210 limiting rotation of the link aim 300, as shown in FIGS. 3 to 9.

As shown in FIGS. 3 to 7B, the center rail 100 has a linear shape and is mounted at a side of the car body.

Here, the center rail 100 has a guide rail shape in which it has outer wails formed at upper and lower portions thereof to enable movement of a base 200 to be described below.

The base 200, which is inserted into the center rail 100 to be movable therein, has a '⊂' shape and is moved along the center rail 100.

In this configuration, a bearing 220 is provided at an outer side of the base 200 to facilitate movement of the base 20( )along the center rail 100.

The link art 300 has a pipe shape and has one end rotatably inserted into the base 200.

Figure 4:
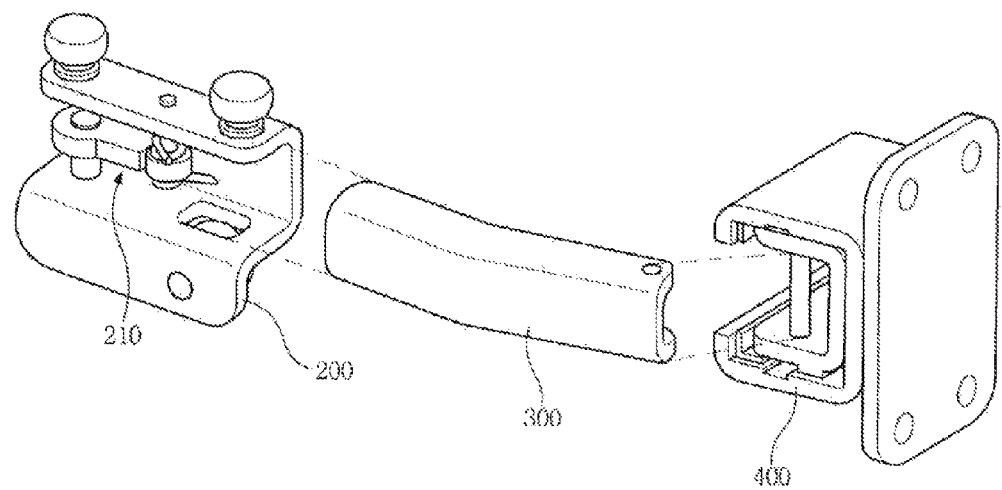
FIG. 4 is an exploded perspective view showing the exemplary linear type center rail link structure of a sliding door for a vehicle according to the present invention.

Here, the link arm 300 may have a shape in which one side thereof is opened as shown in FIG. 4 to allow interference with the base 200 not to be generated at the time of rotation thereof The slider 400, which is rotatably connected to the other end of the link arm 300 connected to the base 200, has an outer side coupled to the sliding door slid from the car body.

As a result, at the time of opening the sliding door of the vehicle, the slider 400 is rotated and moved and the link arm 300 connected to the slider 400 is rotated and moved, such that the base 200 connected to the link arm 300 is moved along the center rail 100 to enable the sliding door to be opened.

Figure 6A:
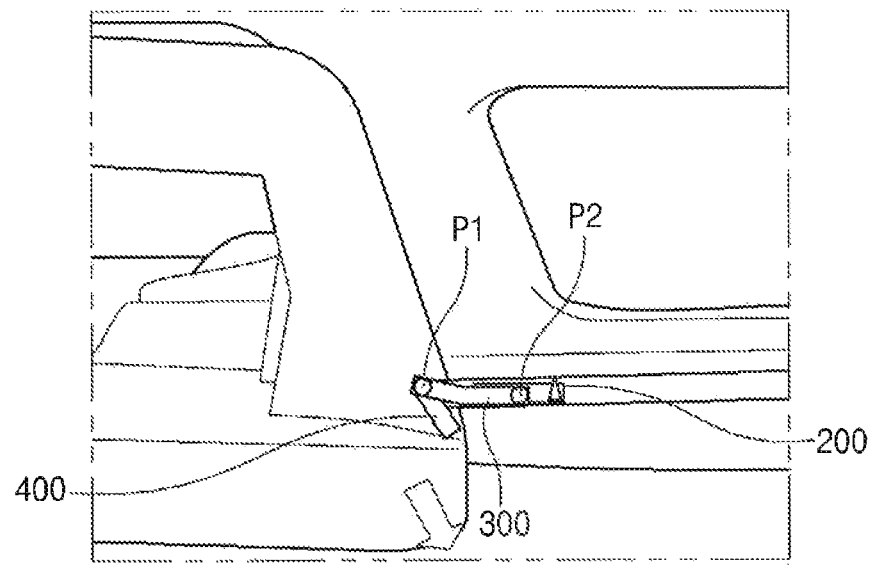
Figure 6B:
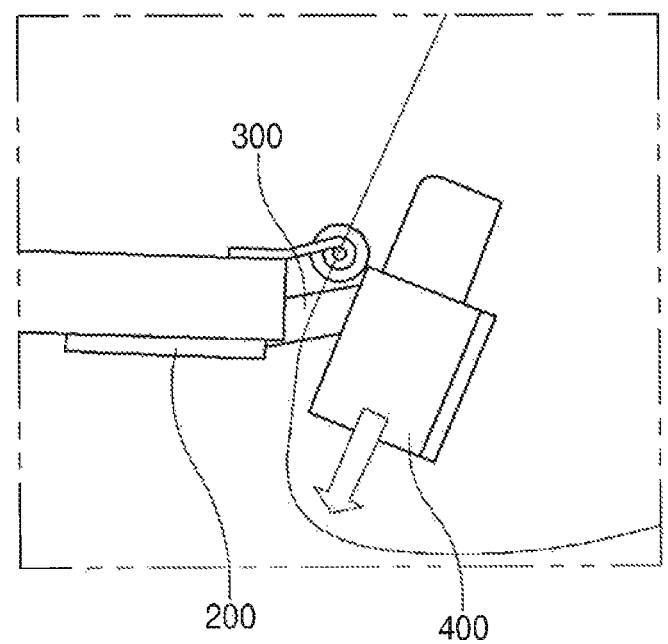
Figure 7A:
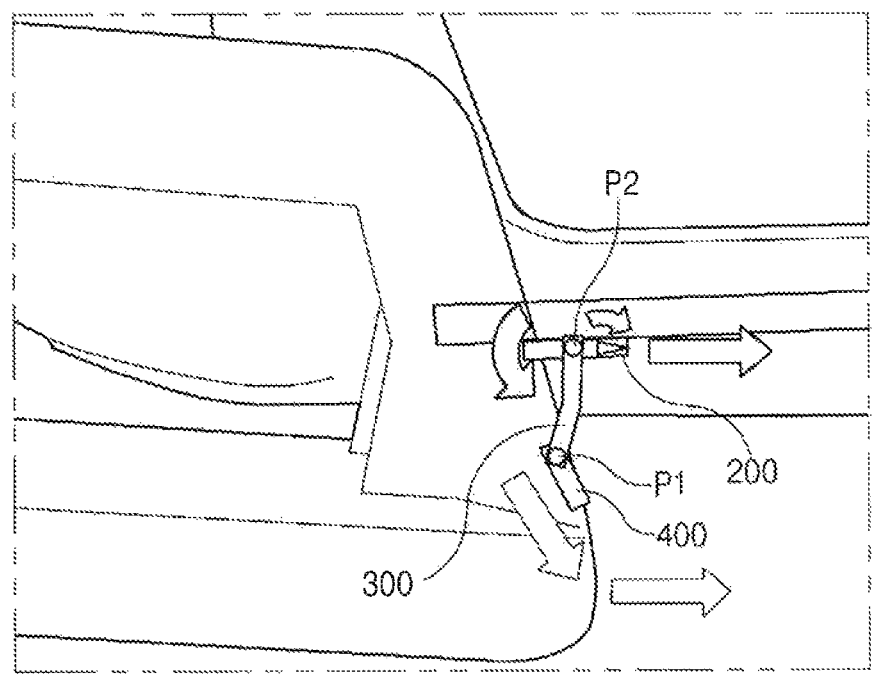
Figure 7B:
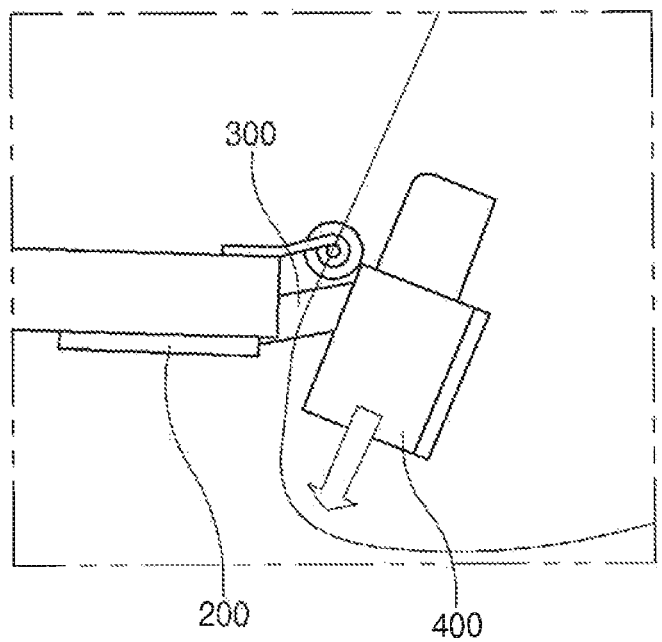

In this case, as shown in FIGS. 5 to 7, a first pivot axis P1 may be formed between the link arm 300 and the slider 400 to enable the slider 400 to be rotated, and a second pivot axis P2 is formed between the base 200 and the link arm 300 to enable the link arm 300 to be rotated.

The latch part 210 is provided at an inner side of the base 200 to limit the rotation of the link arm 300.

Figure 8:
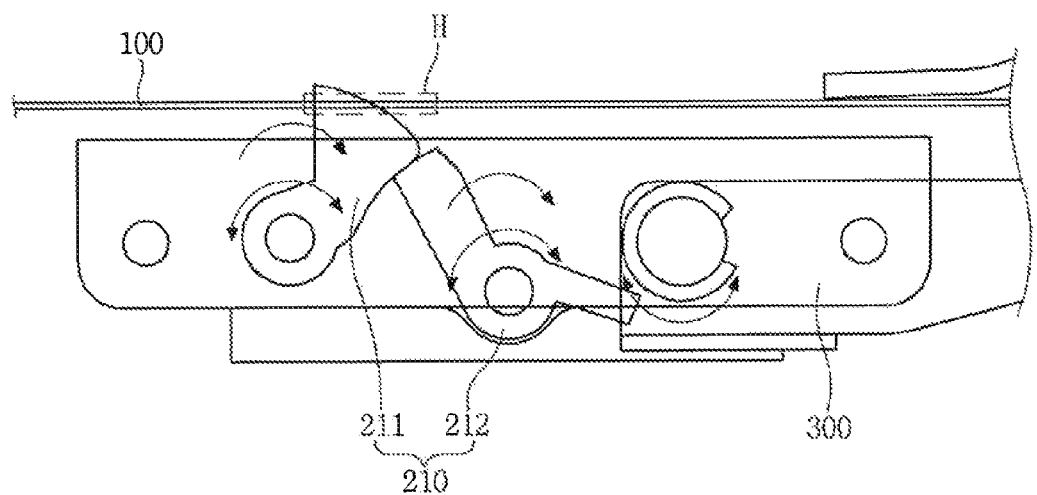
FIG. 8 is a view showing a latch part of the exemplary linear type center rail link structure of a sliding door for a vehicle according to the present invention.

Meanwhile, as shown in FIGS. 4 and 8, the base 200 and the center rail 100 are provided with a catching hole H.

Figure 9A:
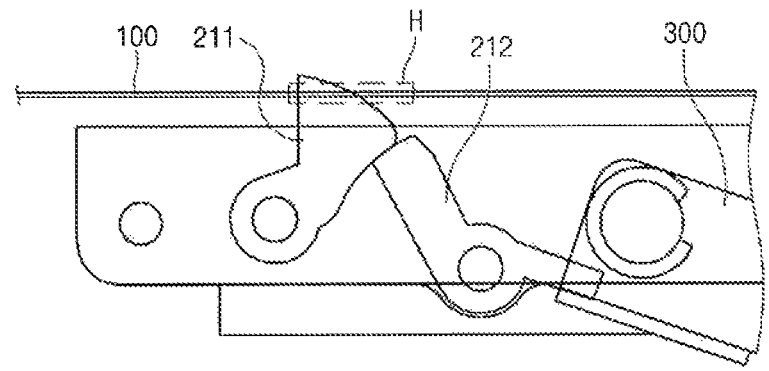
FIGS. 9A to 9C are views showing a state of the latch part at the time of opening the sliding door in the exemplary linear type center rail link structure of a sliding door for a vehicle according to the present invention.
Figure 9B:
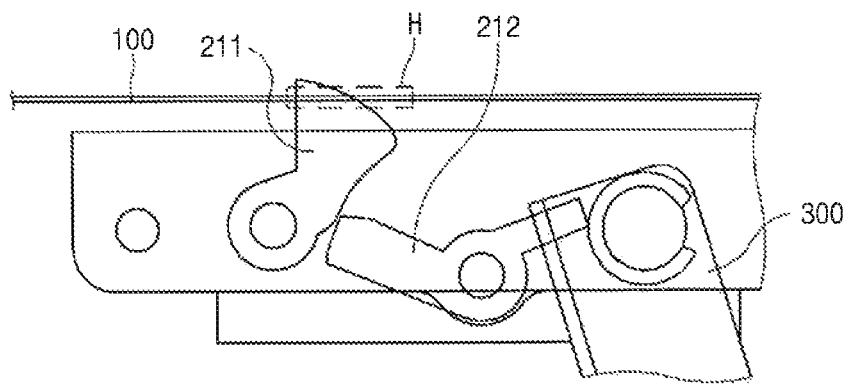
Figure 9C:
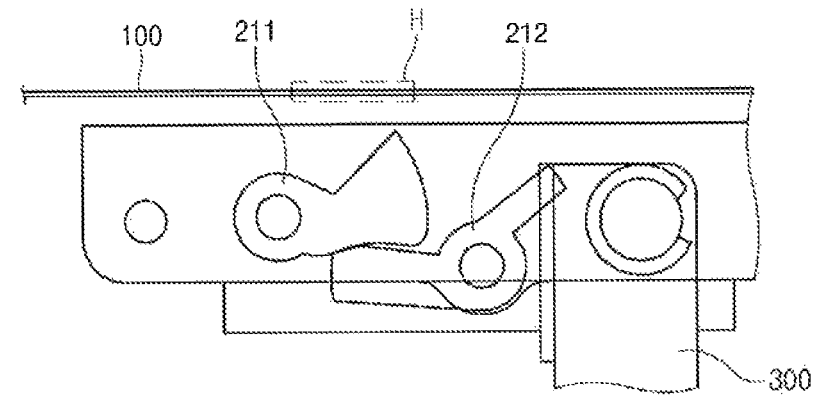

As shown in FIGS. 8 to 9C, the latch unit 210 may further include a lever 211 rotatably provided in the base 200 and having a distal end selectively entering or leaving the catching hole H and a pole 212 having one end selectively engaged with or disengaged from the lever 211 and the other end locked to or unlocked from the link aim 300, by the rotation of the link arm 300, Here, the lever 211 may include a spring, such that it may be restored after being rotated.

Hereinafter, an operation and effect of the present invention will be described.

Figure 5A:
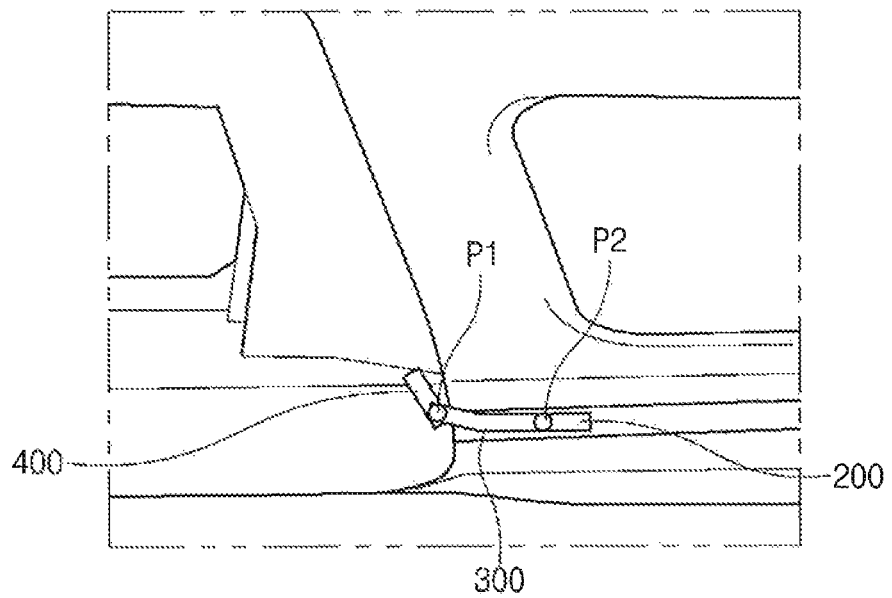
FIGS. 5A to 7B are views showing an open state of the exemplary linear type center rail link structure of a sliding door for a vehicle according to the present invention.
Figure 5B:
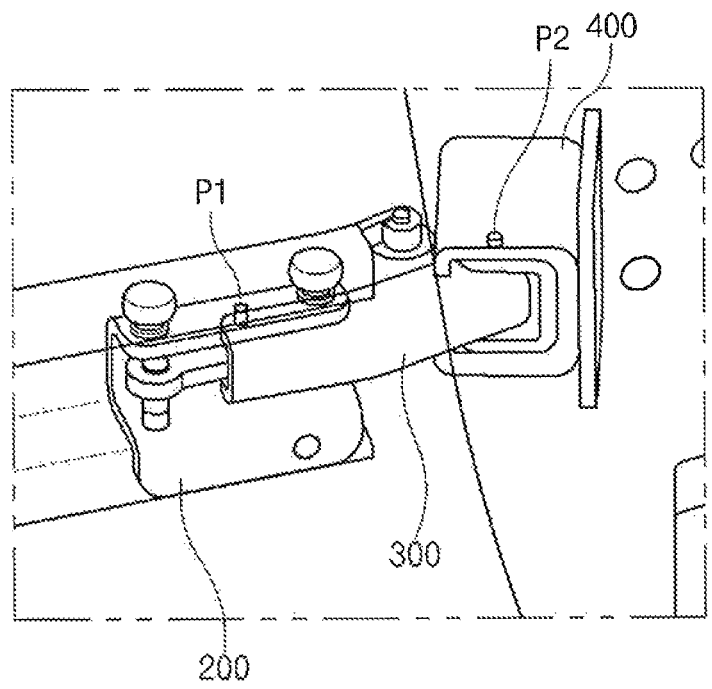

In a state in which the sliding door is closed, as shown in FIGS. 5A and 5B, the base 200 is positioned at one end of the center rail 100, the slider 400 is fixed to the sliding door, and the link arm 300 is maintained in a state in which it connects the base 200 and the slider 400 to each other.

In an initial state (POP-UP) in which the sliding door is opened, as shown in FIGS. 6A and 6B, when the sliding door is popped up, the slider 400 is rotated and moved to prepare opening.

In this case, in the latch part 210, as shown in FIG. 9A, in a closed state, the lever 211 is maintained in a state in which it is caught by the catching groove. When the opening starts, since the link arm 300 starts to be rotated, the pole 212 is rotated, and the lever 211 linked to the pole 212 is also rotated as the pole 212 is rotated.

In a state (TILTING & SLIDING) in which the sliding door is opened, as shown in FIG. 7, the sliding door is opened, such that latching is released by rotation of the lever 211 to rotate the link arm 300. When the link arm 300 is rotated to be in a state in which it is vertical to the base 200, the base 200 is moved along the center rail 100 by force opening the sliding door, such that the opening of the sliding door is completed.

In this case, in the latch part 210, as shown in FIGS. 9B and 9C, when the link arm 300 is rotated, the pole 212 and the lever 211 are disengaged from each other, such that the lever 211 is separated from the catching groove while being rotated by elastic force. Therefore, the lever 211 and the center rail 100 are unlocked from each other, such that the base 200 may be moved along the center rail 100.

Meanwhile, since the closing of the sliding door is performed in a sequence reverse to that of the opening of the sliding door, a detailed description thereof will be omitted.

As described above, according to various embodiments of the present invention, an indoor invasion amount of the center rail is minimized, thereby making it possible to secure an indoor space, the linear type center rail is used, thereby making it possible to improve a design of a vehicle and the link structure is provided, thereby making it possible to improve operability.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and Obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A linear type center rail link structure of a sliding door for a vehicle, the structure comprising:
    a linear type center rail corresponding to the sliding door and mounted at a side of a vehicle body;
    a base provided to be movable along the center rail;
    a link arm having one end rotatably inserted into the base;
    a slider rotatably connected to an other end of the link arm and having an outer side coupled to the sliding door slid from the vehicle body; and
    a latch part provided in the base to limit rotation of the link arm;
    wherein the base and the center rail are provided with a catching hole, and the latch part includes: a lever rotatably provided in the base and having a distal end selectively entering or leaving the catching hole; and a pole having one end selectively engaged with or disengaged from the lever and an other end locked to or unlocked from the link arm, by the rotation of the link arm.

2. The linear type center rail link structure of a sliding door for a vehicle according to claim 1, wherein an outer side of the base is provided with a bearing.

3. The linear type center rail link structure of a sliding door for a vehicle according to claim 1, wherein the lever is biased such that it is restored after being rotated.

4. The linear type center rail link structure of a sliding door for a vehicle according to claim 1, wherein a first pivot axis is formed between the link arm and the slider to enable the slider to be rotated, and a second pivot axis is formed between the base and the link arm to enable the link arm to be rotated.

* * * * *